D. L. HEALY.
ENDLESS TREAD TRACTOR.
APPLICATION FILED OCT. 4, 1917.

1,295,093.

Patented Feb. 18, 1919.
5 SHEETS—SHEET 1.

INVENTOR
D. L. HEALY

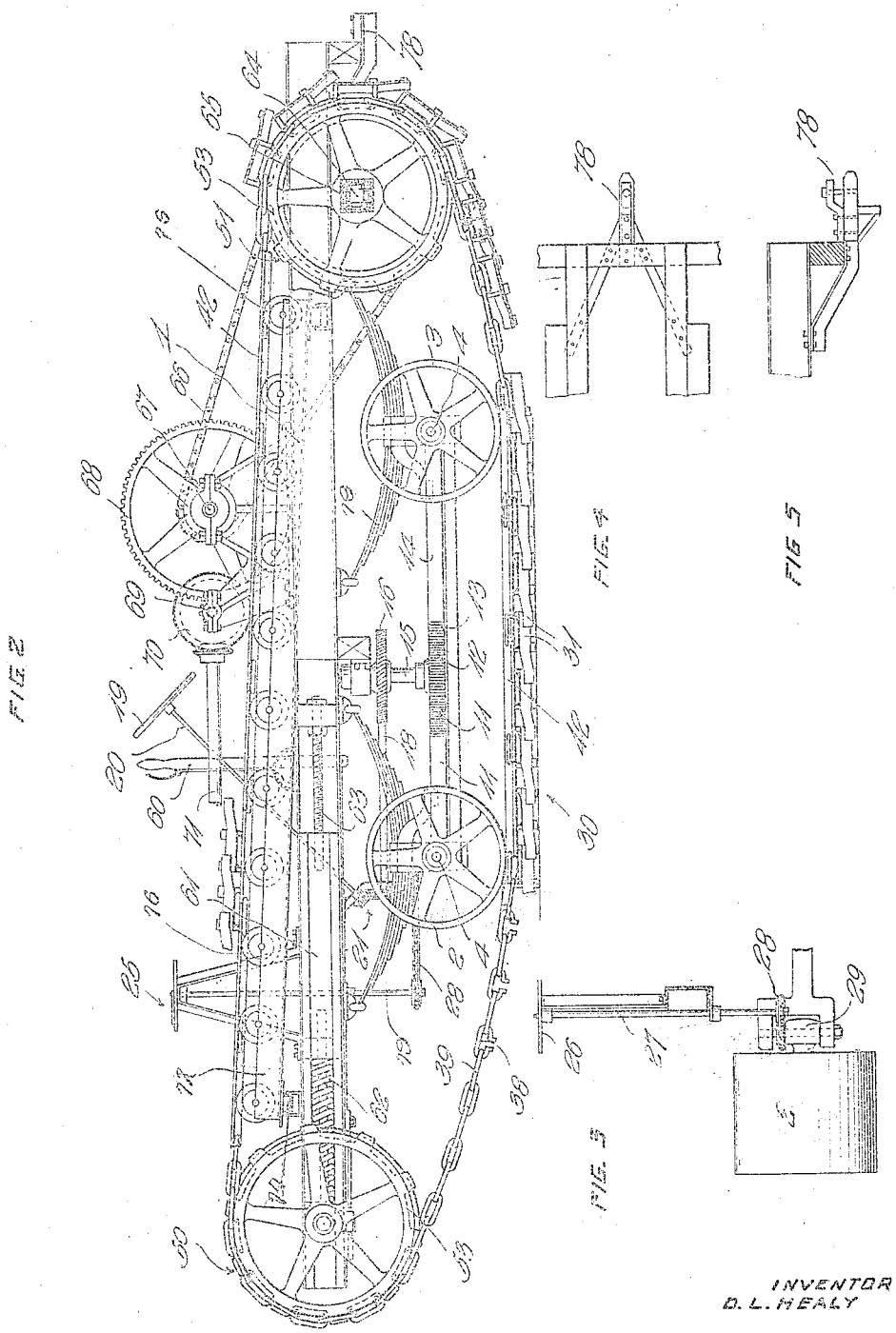

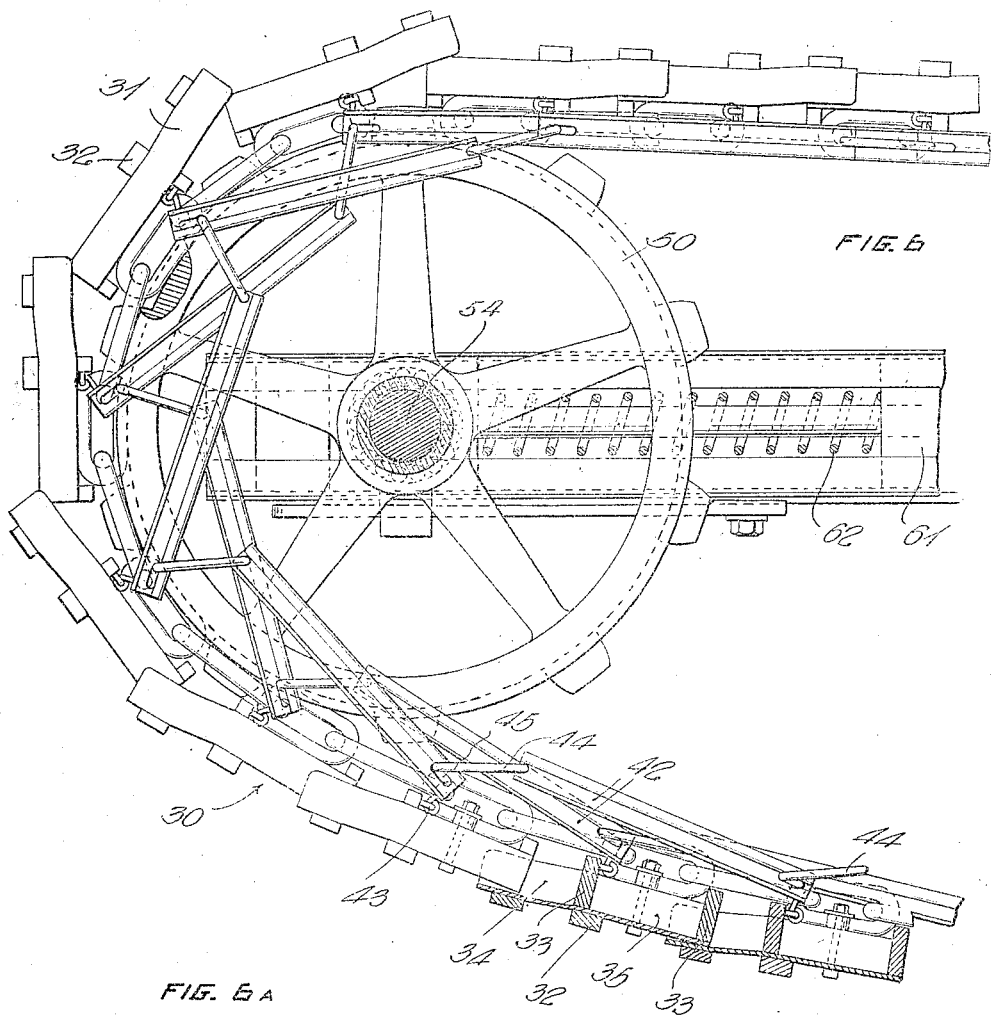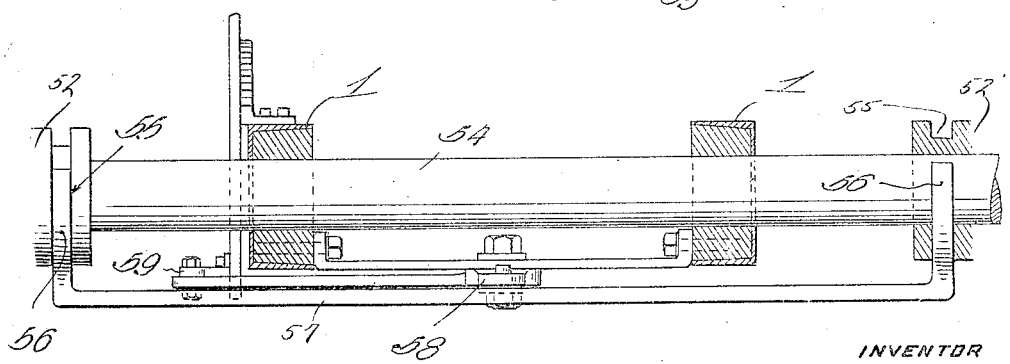

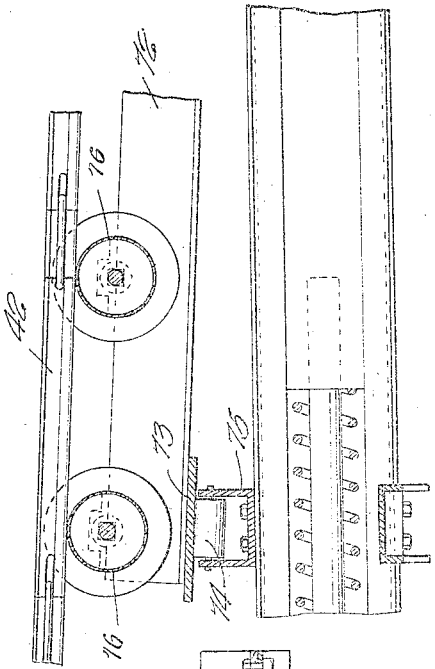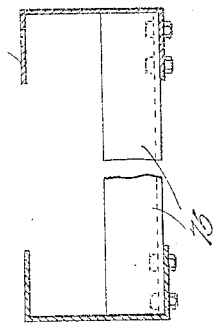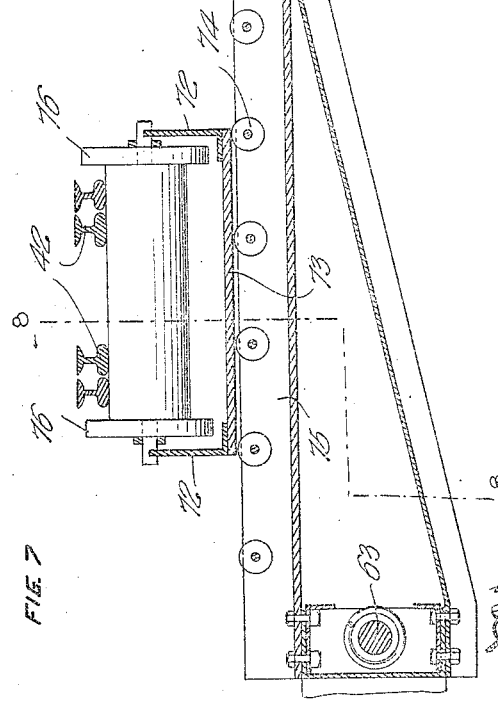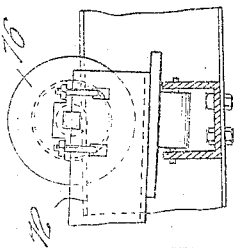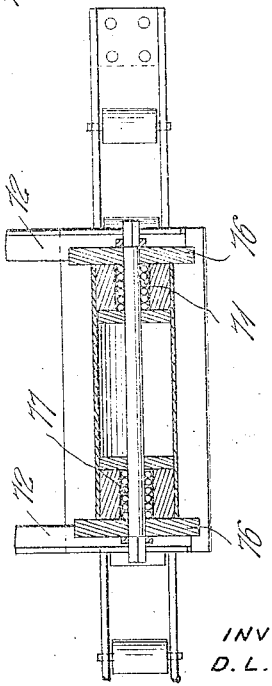

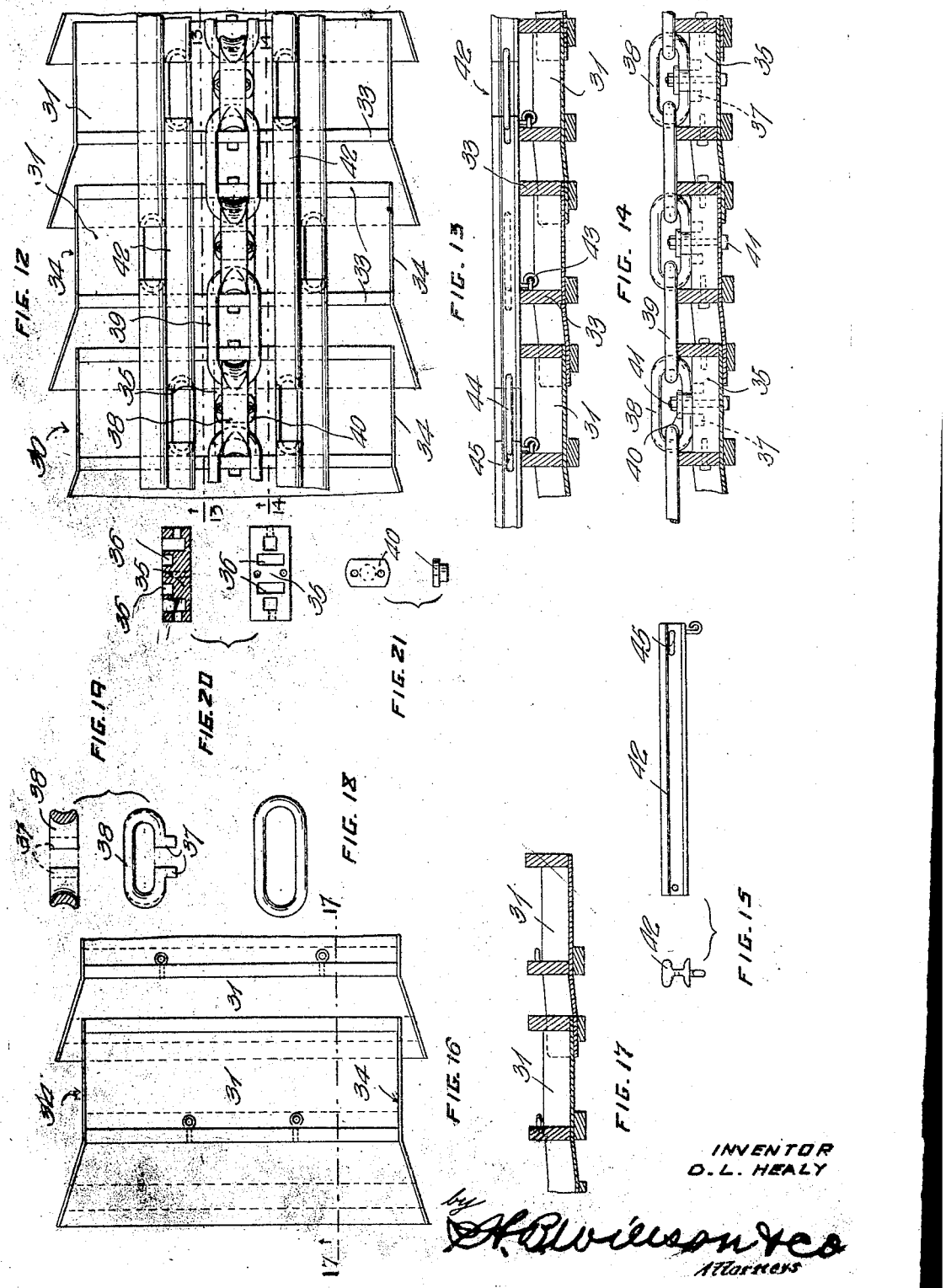

ly described,
UNITED STATES PATENT OFFICE.

DANIEL L. HEALY, OF SAN FRANCISCO, CALIFORNIA.

ENDLESS-TREAD TRACTOR.

1,295,093.

Specification of Letters Patent.   Patented Feb. 18, 1919.

Application filed October 4, 1917.   Serial No. 194,741.

*To all whom it may concern:*

Be it known that I, DANIEL L. HEALY, a citizen of the United States, residing at San Francisco, in the county of San Francisco and State of California, have invented certain new and useful Improvements in Endless-Tread Tractors; and I do declare the following to be a full, clear, and exact description of the invention, such as will enable others skilled in the art to which it appertains to make and use the same.

My invention has for one of its objects to provide a tractor of the caterpillar tread type which may be simply and inexpensively constructed, yet one which will be highly efficient and durable.

A further object is to provide a tractor which may be easily steered in any required direction.

Yet another object is to provide a novel type of tread track having a plurality of longitudinal rail sections which coöperate in forming a pair of continuous tracks upon which the supporting wheels of the tractor frame travel.

A still further object of the invention is to provide supporting frames for the upper reaches of the tread tracks, said frames being shiftable laterally as said tracks move during the steering operation.

With the foregoing general objects in view, the invention resides in the novel features of construction and unique combinations of parts to be hereinafter fully described and claimed, the descriptive matter being supplemented by the accompanying drawings, which form a part of this specification and in which:

Fig. 2 is a side elevation with parts omitted;

Fig. 3 is a detail vertical transverse section showing more particularly the operating means for the indicator which discloses the direction in which the steering wheels are set;

Figs. 4 and 5 are respectively top plan and longitudinal sectional views of the draft clevis at the rear end of the machine;

Fig. 6 is an enlarged side elevation, partly in section, showing the manner in which the caterpillar tread tracks pass around the front and rear wheels which guides them;

Fig. 7 is an enlarged transverse section on the plane of the line 7—7 of Fig. 1;

Fig. 8 is a detail longitudinal section on the plane designated by the line 8—8 of Fig. 7;

Fig. 9 is a top plan view of Fig. 7 partly in horizontal section;

Fig. 10 is a detail longitudinal section on the plane indicated by line 10—10 of Fig. 1;

Fig. 11 is a transverse section taken substantially on the plane of the line 11—11 of Fig. 1, but illustrating only the frame structure on this plane;

Fig. 12 is an enlarged inner side elevation of a portion of the caterpillar track structure;

Figure 1:
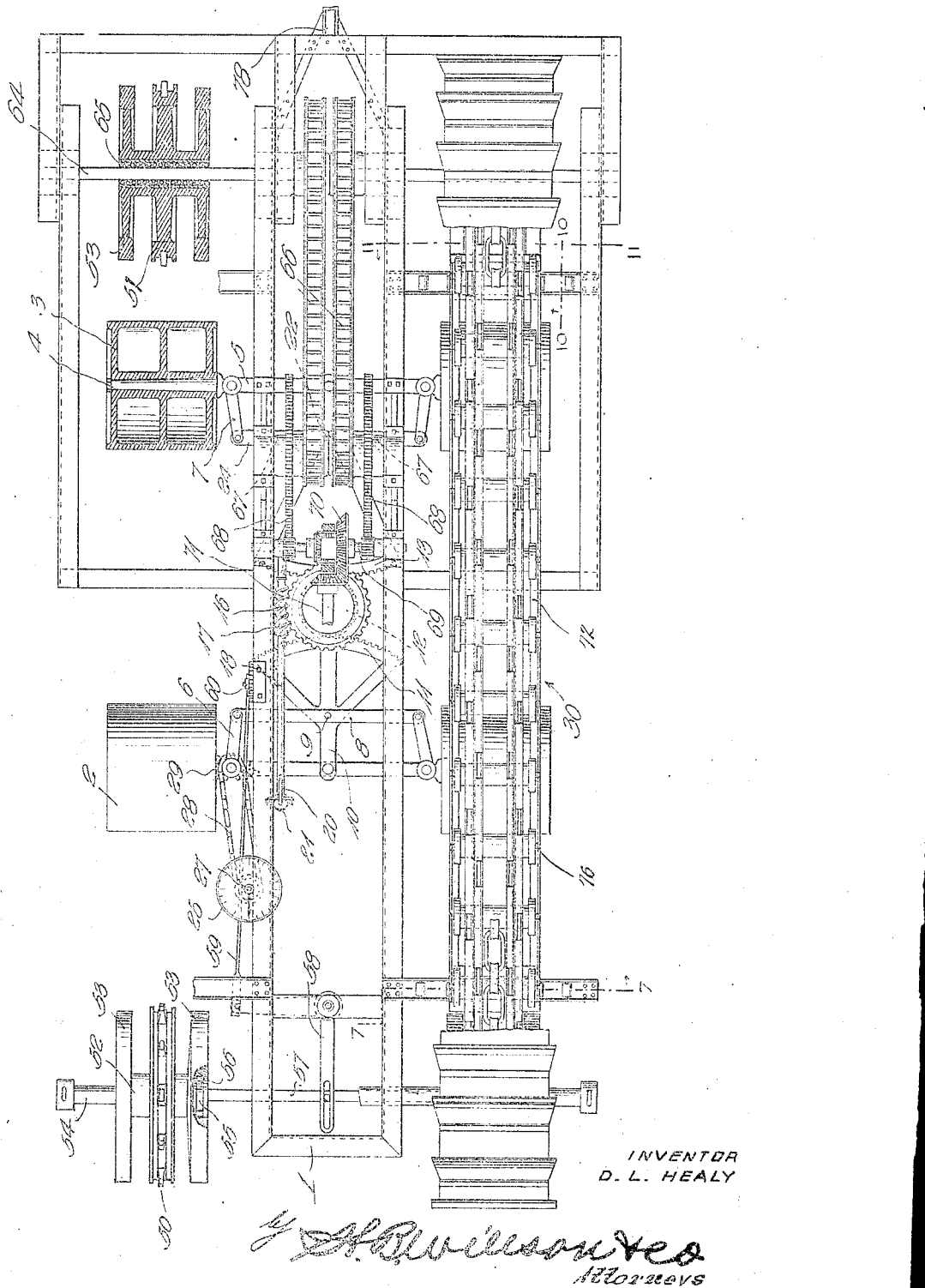
Figure 1 is a top plan view of the improved tractor with parts omitted for the sake of clearness.

Figs. 13 and 14 are longitudinal sections on the planes of the lines 13—13 and 14—14 of Fig. 12;

Fig. 15 discloses both an end and a side elevation of one of the rail sections upon which the supporting wheels travel;

Fig. 16 is a plan view showing two of the tread plates;

Fig. 17 is a longitudinal section of Fig. 16 on the plane of the line 17—17;

Fig. 18 is a plan view of one of the links employed in connecting the tread plates;

Fig. 19 discloses both a side elevation and a horizontal section of one of the links employed between the links shown in Fig. 18;

Fig. 20 illustrates a longitudinal section and an inner side elevation of one of the blocks in which the links shown in Fig. 19 are anchored; and, Fig. 21 discloses a plan view and an end elevation of one of the clamping plates employed for securing the links to the blocks of Fig. 20.

Fig. 6ª is a transverse section of the means for shifting the front wheels laterally.

In the drawings above briefly described, the numeral 1 designates a horizontally disposed elongated frame supported on front and rear wheels 2 and 3, said wheels being rotatably mounted on spindles 4 which are pivoted to the ends of axles 5 for horizontal swinging, the front and rear spindles having crank arms 6 and 7 respectively. The crank arms 6 are connected by a transverse steering rod 8 and the latter is pivoted at 9 to a longitudinally extending lever 10, said lever having at its rear end a sector 11 which meshes with a spur gear 12, said gear also meshing with a second sector 13 on the front end of a longitudinal lever 14, the latter being fulcrumed to the rear axle and the lever 10 is similarly mounted upon the front axle. The gear 12 is carried by a shaft 15 having a worm gear 16 with which a worm 17 meshes, said worm being carried by a longitudinal shaft 18 which may be turned at will by the hand wheel 19, said wheel and shaft being operatively connected by means of a steering post 20 and beveled gears 21.

By the arrangement of parts just described, turning of the wheel 19 in one direction or the other, will steer both the front and rear wheels, but they will be turned in opposite directions as will be obvious from the operating connections shown. Furthermore, the front wheels 2 will be turned more abruptly or quicker than the rear wheels 3, since the lever 10 is of less length between its pivot 9 and sector 11, than the distance between the sector 13 and the pivot 22 by means of which the lever 14 is connected with a transverse steering rod 24 which is pivoted at its ends to the arms 7. This unequal and opposite turning of the front and rear wheels 2 and 3 is highly essential in the proper steering of the machine.

Preferably employed in connection with the features of construction above described, is an indicator 25 connecting with a dial 26 to disclose the angular relation of the front wheel 2 with the frame 1, said indicator being carried on the upper end of a vertical shaft 27 (Fig. 3), which is connected by a sprocket chain 28 to the horizontally swinging knuckle 29 of one of the spindles 4. By this arrangement, it will be obvious that whenever the spindle in question is swung horizontally, the indicator 25 will be actuated to disclose the exact amount which the front wheels have been turned.

A pair of caterpillar track structures 30 are provided to receive thereon the supporting wheels 2 and 3, said tracks being of the novel construction illustrated most clearly in Figs. 6, and 12 to 21. Each track 30 includes a plurality of tread plates 31 each having a wide end and a narrow end, all of said plates being of channel-shape so that the narrow ends of said plates may be received in the wide ends of adjacent plates as will be clear from Fig. 12. The outer sides of the tread plates 31 are equipped with suitable calks 32, whereas transverse bars 33 are secured to and extend throughout the width of the inner sides of said plates, the ends of said bars being secured to the side flanges 34 of the several plates. Rectangular blocks 35 are interposed between the bars 33 and are rigidly secured in place, one of said blocks being provided for each of said plates 34. The blocks 35, as shown more particularly in Fig. 20, are provided with sockets 36, said sockets receiving therein lugs 37 on the ends of open links 38 which are illustrated in detail in Fig. 19, said links 38 coöperating with other links 39 (see Fig. 18) in forming an endless chain which connects all of the tread plates 34. Suitable clamping plates 40 such as illustrated in Fig. 21, and clamping bolts 41, are employed for securing the links 38 in operative relation with the blocks 36, the general assemblage of parts being illustrated more particularly in Fig. 14.

A plurality of longitudinal rail sections 42 are provided on the inner sides of the pull chains of track 30 to form continuous tracks upon which the front and rear wheels 2 and 3 travel, one end of each rail section 42 being pivoted at 43 to the transverse bars 33, whereas the other ends of said rails are connected by links 44 with the pivoted ends of adjacent rails. To allow the necessary movement, the links 44 are passed through slots 45 in one end of the rail sections as illustrated most clearly in Fig. 6. It will be observed that each tread 30 is provided with two series of rail sections 42 and that the sections of the two series are disposed in staggered relation. By this arrangement, when the wheels 2 and 3 travel over the joints between the adjacent ends of the several sections, there will be no hammering, since the central portion of the adjacent rail section of the next series, is supporting the load while the wheels are traveling over the gaps. The several rail sections thus form an uninterrupted and continuous track upon which the wheels 2 and 3 travel.

For the purpose of guiding the pull chains and for driving them, front and rear sprocket wheels 50 and 51 are provided, the teeth of said sprocket wheels being received in the links 39 as shown most clearly in Fig. 6. The hub 52 of each sprocket wheel is provided with a pair of auxiliary wheels 53 on its ends, the spaces between the sprocket wheels and said wheels 53, serving to receive the rail sections 42 as will be clear from Fig. 6. The hubs 52 of the sprocket wheels 50 are rotatable and slidable upon a fixed transverse axle 54 and said hubs are provided at their inner ends with circumferential grooves 55 which receive forks 56 carried on a transverse shifter rod 57, a bell-crank lever 58 being connected to said rod for shifting the same in one direction or the other as occasion may demand, so that the front wheels may be moved laterally in either direction according to the manner in which the tractor is to be turned. Any preferred means may well be employed for operating the bell-crank lever 58, but a longitudinal rod 59 preferably leads rearwardly therefrom to a suitable hand lever 60.

In order that the axle 54 may be shifted forwardly and rearwardly when removing, for instance, broken links from the chain, or applying additional links, sliding blocks 61 are carried by the frame 1, coiled springs 62 being interposed between said blocks and the axle 54, and screws 63 are employed for shifting the blocks 61 forwardly and rearwardly as occasion may demand.

The hubs 52 of the sprocket wheels 51 and the auxiliary wheels 53 thereof, are slidable along a transverse axle 64 which is rotatably mounted, said axle being preferably of the rectangular shape shown in Fig. 2, roller bearings 65 being mounted in the hubs of said rear wheels, in order that they may freely slide along the axle 64, this action taking place as the pull chains are curved throughout their length by the steering of the machine. It is thus insured that no binding of the chains upon the wheels shall take place. The axle 64 is formed in two sections, said sections being driven by a pair of sprocket chains 66 from a pair of transverse shaft sections 67 which are in turn driven by gearing 68 from the shaft sections 69 of a suitable differential 70, the shaft 71 of a suitable engine (not shown) being employed for driving said differential.

By the arrangement thus described, it will be observed that both of the rear sprocket wheels 51 will be driven to actuate the pull chains and to propel the entire machine over the earth, and due to the drive as described, said wheels may rotate at different speeds when turning.

For the purpose of supporting the upper reaches of the tread tracks 30 and permitting them to shift laterally as the front wheels 50 are so moved for the purpose of steering, a pair of longitudinally disposed supporting frames 72 are provided, said frames including transverse bars 73 of Figs. 7, 8, 9 and 10 which rest on rollers 74, the latter being mounted in the channels of transverse bars or tracks 75 which are suitably carried by the frame 1. Each frame 72 is provided with a plurality of transverse flanged rollers 76 upon which the rail sections 42 travel, each roller 76 preferably having ball or roller bearings as indicated at 77 in Fig. 9.

Any preferred type of hitch such as the clevis 78 may be employed for hitching the tractor to any machine or machines to be pulled thereby. Although only one clevis 78 is illustrated, it will be obvious that any suitable number may well be employed, according to the work to be performed by the machine.

Another feature preferably though not necessarily employed is a spring mounting for the frame 1, this mounting being shown in the present embodiment of the invention as consisting of a plurality of semi-elliptical springs 79 which are secured to the front and rear axles and pivotally connected in any preferred manner with the frame. Springs of this type are preferably employed on account of their well-known efficiency, but I wish it understood that numerous other styles of spring devices could well be used.

The operation of a machine constructed as above described is substantially as follows: The engine is started and when the clutch (not shown) is thrown in, the shaft 71 will be rotated to drive the axle 64 through the instrumentality of the driving connections above described. Axle 64 rotates the rear sprocket wheels 51 and thus causes the tread tracks 30 to travel forwardly over the earth, the entire machine being in the meantime supported by the front and rear wheels 2 and 3. When steering either in one direction or the other the lever 60 and the steering wheel 19 are operated so that the wheels 50 are shifted along the shaft 54 to change the direction of travel of the tread tracks 30 and to locate the wheels 2 and 3 at the proper angle for turning the entire machine upon said tracks, that is, the track formed by the rails and pull chains is first laid in the direction in which the machine is to travel, and the wheels 2 and 3 then follow upon this track. It may here be stated, that although I have shown independent means for shifting the wheels 50 and for turning the wheels 2 and 3, a common control could well be employed for this purpose, so that the use of an indicator such as 25 to determine the angular relation of the wheels 2 and 3, would be unnecessary. In either case, the steering connections between the front wheels 2 and the rear wheels 3, will by preference be constructed as shown, that is so that the front wheels turn more abruptly than the rear wheels, it having been found that this is highly effective. As the tread tracks are shifted in one direction or the other during the steering operation, the supporting frames 72 thereof will shift laterally upon their rollers 74 and thus no binding action will take place.

From the foregoing, taken in connection with the accompanying drawings, it will be obvious that although the invention is of comparatively simple and inexpensive nature, it will be highly efficient and durable for numerous purposes. Probably the best results are obtained from the specific features of construction shown and described, and I therefore consider these features the preferred form of my invention. I wish it understood, however, that within the scope of the appended claims, numerous minor changes may well be made.

I claim:

1. In an endless tread machine, the combination of a frame, front and rear supporting wheels for said frame and means for steering said wheels, a pair of endless tread tracks upon the lower reaches of which said wheels travel, and front and rear guide wheels around which said tracks pass, said guide wheels being shiftable axially.

2. In an endless tread machine, the combination of a frame, front and rear supporting wheels for said frame and means for steering said wheels, a pair of endless tread tracks upon the lower reaches of which said wheels travel, front and rear guide wheels around which said tracks travel, said guide wheels being shiftable axially, longitudinal frames upon which the upper reaches of said tracks travel, and means for supporting said frames from said first named frame for permitting lateral movement of the former.

3. In an endless tread machine, the combination of a frame, front and rear supporting wheels for said frame and means for steering said wheels, a pair of endless tread tracks upon the lower reaches of which said wheels travel, front and rear guide wheels around which said tracks travel, said guide wheels being shiftable axially, longitudinal frames upon which the upper reaches of said tracks travel, and transverse tracks supporting said frames for lateral sliding.

4. In an endless tread machine, the combination of a frame, supporting wheels for said frame, and endless tread chains having longitudinally disposed rail sections on their inner sides forming continuous tracks for said wheels, each chain having two series of said rail sections and the sections of said series being staggered.

5. In an endless tread machine, the combination of a frame, supporting wheels for said frame, endless tread chains having longitudinally disposed rail sections on their inner sides forming continuous tracks for said wheels, means pivotally connecting one end of said rail sections with said chains, and a link connection between the other end of each rail section and the pivoted end of the adjacent section.

6. In an endless tread, the combination of a frame and supporting wheels therefor, a pair of endless pull chains, intermeshing channel-shaped tread plates secured to the outer sides of said chains, transverse bars extending between the side flanges of said tread plates, and a plurality of rail sections forming continuous tracks for said supporting wheels, one end of each of said sections being pivoted to the adjacent transverse bar, and a link connection between the opposite ends of each of said rail sections and the pivoted end of the adjacent section.

7. In an endless tread machine, the combination of a frame having supporting wheels, a pair of laterally shiftable endless tread tracks upon whose lower reaches said wheels travel, a pair of longitudinal frames slidably supporting the upper reaches of said tracks, and transverse tracks supporting said frames for laterally shifting.

8. In an endless tread machine, the combination of a frame, supporting wheels for said frame, guide wheels spaced toward one end of the frame from said supporting wheels and means for shifting said guide wheels axially, additional guide wheels spaced toward the other end of said frame from said supporting wheels, and a pair of caterpillar tread tracks trained around said guide wheels, said supporting wheels traveling on said tracks.

9. In an endless tread machine, the combination of a frame, supporting wheels for said frame and means for steering said wheels, guide wheels spaced toward one end of the frame from said supporting wheels and means for shifting said guide wheels relatively to the frame for steering, additional guide wheels spaced toward the other end of said frame from said supporting wheels, and a pair of caterpillar tread tracks trained around said guide wheels, said supporting wheels traveling on said tracks.

10. In an endless tread machine, the combination of a frame, supporting wheels for said frame, guide members in front and rear of said supporting wheels and each consisting of a central sprocket and guide wheels spaced outwardly therefrom, a pair of pull chains trained around said sprockets and passing under said supporting wheels, tread members secured to said chains, and supporting tracks for said supporting wheels carried by said tread members and traveling between said sprockets and said guide wheels.

In testimony whereof I have hereunto set my hand in the presence of two subscribing witnesses.

DANIEL L. HEALY.

Witnesses:
N. H. BAUGHMAN,
JAMES K. MOFFITT.